(12) United States Patent
Ma

(10) Patent No.: US 10,860,296 B2
(45) Date of Patent: Dec. 8, 2020

(54) TECHNIQUES AND ARCHITECTURES FOR MANAGING AND ANALYZING SYSTEM UPDATES

(71) Applicant: salesforce.com, inc., San Francisco, CA (US)

(72) Inventor: Billy Ma, San Mateo, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 16/264,546

(22) Filed: Jan. 31, 2019

(65) Prior Publication Data

US 2020/0249915 A1   Aug. 6, 2020

(51) Int. Cl.
*G06F 8/20* (2018.01)
*G06F 8/65* (2018.01)
*G06F 8/38* (2018.01)
*G06F 9/451* (2018.01)

(52) U.S. Cl.
CPC .................. *G06F 8/20* (2013.01); *G06F 8/38* (2013.01); *G06F 8/65* (2013.01); *G06F 9/451* (2018.02)

(58) Field of Classification Search
CPC ... G06F 8/20; G06F 8/65; G06F 9/451; G06F 8/38
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

Non-Final Office Action for U.S. Appl. No. 16/399,799 dated Jun. 11, 2020, 15 pages.

*Primary Examiner* — Phillip H Nguyen
(74) *Attorney, Agent, or Firm* — Jaffery Watson Mendonsa & Hamilton LLP

(57) ABSTRACT

Techniques and architectures for managing streamlining validation operations. Tokens to represent at least one of a style characteristic, a script component and a layout element are provided. An update bundle having two or more tokens representing changes from previous versions of corresponding tokens to specify current versions of the tokens, is provided. User interface code is analyzed to determine if the code utilizes the two or more tokens in a manner consistent with the current versions of the tokens. An activity list for tokens in the UI not being used in the manner consistent with the current versions of the tokens is generated.

18 Claims, 6 Drawing Sheets

(56) References Cited

U.S. PATENT DOCUMENTS

| | | |
|---|---|---|
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 8,839,126 B1* | 9/2014 | Tang .................. G06F 8/658 715/764 |
| 9,009,669 B2* | 4/2015 | Pletter ............. G06F 11/3688 717/124 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2003/0236576 A1 | 12/2003 | Resnick et al. |
| 2004/0001092 A1 | 1/2004 | Rothwein et al. |
| 2004/0003371 A1 | 1/2004 | Coulthard et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0069753 A1* | 3/2006 | Hu ..................... H04L 67/34 709/220 |
| 2009/0144640 A1 | 6/2009 | Schneider et al. |
| 2009/0177744 A1 | 7/2009 | Marlow et al. |
| 2011/0265066 A1* | 10/2011 | Fee ..................... G06F 8/41 717/139 |
| 2014/0278813 A1 | 9/2014 | Grosset et al. |
| 2015/0039682 A1* | 2/2015 | Chasman ............ H04L 67/2857 709/203 |
| 2016/0170775 A1* | 6/2016 | Rockwell ............ G06F 13/4282 713/100 |
| 2018/0337920 A1 | 11/2018 | Stites et al. |
| 2019/0095197 A1 | 3/2019 | Ross et al. |
| 2020/0042648 A1 | 2/2020 | Rao |

* cited by examiner

```
<div class="slds-m-left--small anotherClass slds-m-right--small">...</div>
``` slds-m-left_small slds-m-right_small slds-m-top_small

```
$A.createComponent("markup://emailui:outputRichText", {
    htmlContent: mergedBodySpan,
    class: 'slds-m-top--small'},
    function(outputRichText, status, errorMessage) {
        if (status === "SUCCESS") {
            cmp.find('preview').set('v.body', outputRichText);
        } else if (status === "INCOMPLETE") {
            $A.getEvt('markup://force:showOfflineMessage').fire();
        } else if (status === "ERROR") {
            $A.getEvt('markup://force:showMessage').setParams({
                message: errorMessage,
                severity: "error"}).fire();
        }
    }
})
```

TECHNIQUES AND ARCHITECTURES FOR MANAGING AND ANALYZING SYSTEM UPDATES

TECHNICAL FIELD

Embodiments relate to techniques for managing streamlining validation operations. More particularly, embodiments relate to techniques for more efficiently and seamlessly validating token utilization in a complex computing environment supporting multiple user interfaces (UIs).

BACKGROUND

Many computing environments, for example, cloud-based environments like salesforce, allow individual users/groups to customize user interfaces. In order to support this customization, tools and components are provided to support these customizations. However as updates to the tools and components can result in previously functional UIs losing functionality.

BRIEF DESCRIPTION OF THE DRAWINGS

Embodiments of the invention are illustrated by way of example, and not by way of limitation, in the figures of the accompanying drawings in which like reference numerals refer to similar elements.

FIG. 3 is an example of a HyperText/JavaScript object that can be analyzed and validated as described herein.

DETAILED DESCRIPTION

Figure 1:
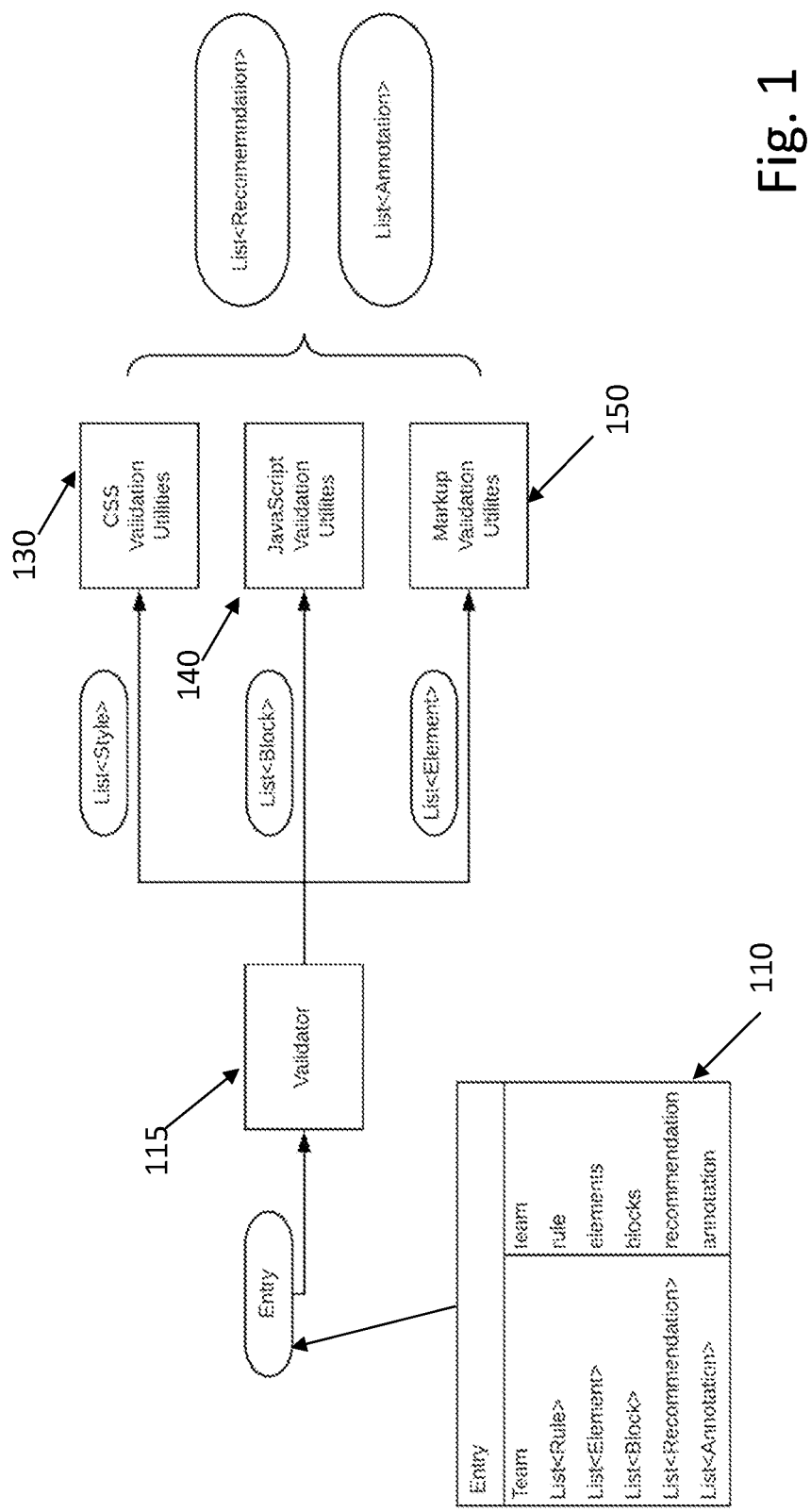
FIG. 1 is a flow diagram that illustrates one embodiment of a technique for managing and validating updates.

In the following description, numerous specific details are set forth. However, embodiments of the invention may be practiced without these specific details. In other instances, well-known structures and techniques have not been shown in detail in order not to obscure the understanding of this description.

Described herein are techniques to provide analysis/validation/inspection at the bundle level. For example, a bundle of Cascading Style Sheets (CSS), JavaScript (JS) and/or Hypertext Markup Language (HTML) templates that can be treated as one unit for analysis/validation/inspection purposes. In some embodiments, this functionality can be provided consistently. Many of the examples provided herein are described in terms of Salesforce Lightning Design System (SLDS) definitions and tokens; however, the techniques described herein can also be applied in different environments.

SLDS is a styling application program interface (API) that is updated periodically. The corresponding values, functionality and/or signatures can change between versions/releases. The techniques described herein can be utilized to support these updates and increase efficiency.

Use of the techniques described herein with the SLDS embodiments can result in a reduction of the burden on the developer to match tokens during development, can reduce the size of the CSS bundle, which can improve performance, and can provide support for UI requirements (e.g., theming, densification). Within this structure SLDS tokens can be utilized to store/communicate design attributes for CSS (or other) files.

In one embodiment, the techniques described herein can function to reduce design complexity. For example, each change within a bundle can be scanned against any design system for relevant information. In the SLDS embodiment, for example, an existing implementation can scan one or more markup templates, JavaScript and/or style declaration(s). This component bundle can be translated into, for example, an abstract syntax tree (AST) or other structure. From there, a component tree can be constructed and analysis can be performed on the component tree. For example, the analysis can be static analysis, regular expression analysis and/or structure hierarchy analysis. In one embodiment, a recommendation can be generated and relevant flows can be created before constant integration (CI) and/or automation functionality is triggered.

In various embodiments described herein, static values within CSS files are tokenized. Thus, in the SLDS embodiments, as SLDS tokens are updated with new releases/updates, the corresponding values (e.g., static values) in the bundled CSS files can be consistently and automatically updated, which can function to streamline the update process. Similarly, utility classes in HTML and can be tokenized within the bundles.

In various embodiments, Design tokens are the visual design atoms of the design system. Specifically, tokens are named entities that store visual design attributes. The tokens can be used in place of hard-coded values (e.g., hex values for color or pixel values for spacing) in order to maintain a scalable and consistent visual system for UI development.

In various embodiments, tools described herein can function to analyze CSS, JS and/or HTML files to find one or more of: static values and incorrect token usage in the CSS files; invalid utility classes in the JS and/or HTML files; and/or provide recommendations to fix identified errors.

FIG. 1 is a flow diagram that illustrates one embodiment of a technique for managing and validating updates. The example of FIG. 1 is directed to use of CSS, JS and HTML; however, other protocols/languages/platforms/structures can also be supported.

In one embodiment, entry 110 include a bundle of tokens (e.g., List<Rule>, List<Element>, List<Block>, List<Recommendation>, List<Annotation>). In one embodiment, entry 110 can be analyzed/processed by validator 115, which can provide the management and/or validation functionality described herein. In alternate embodiments, the management and/or validation functionality can be managed by validator 115.

In one embodiment, validator 115 can function to analyze component bundles and recommend relevant SLDS definitions. For example, validator 115 can identify invalid class definitions, identify deprecated classes and provide a current valid class, can identify markup or style or other values that may be invalid.

In the example, of FIG. 1, CSS Validation Utilities 130 can include one or more functional agents to perform these functions on CSS tokens. Similarly, JavaScript Validation Utilities 140 can include one or more functional agents to perform these functions on JS tokens. Further, Markup Validation Utilities 150 can include one or more functional agents to perform these functions on HTML tokens.

In various embodiments, a CSS file can contain a set of declarations that matches a CSS class that can be used in an element within a HTML file. That is, tokens can be cross-referenced within the same bundle of (e.g., HTML, JS, CSS) files.

Figure 2:
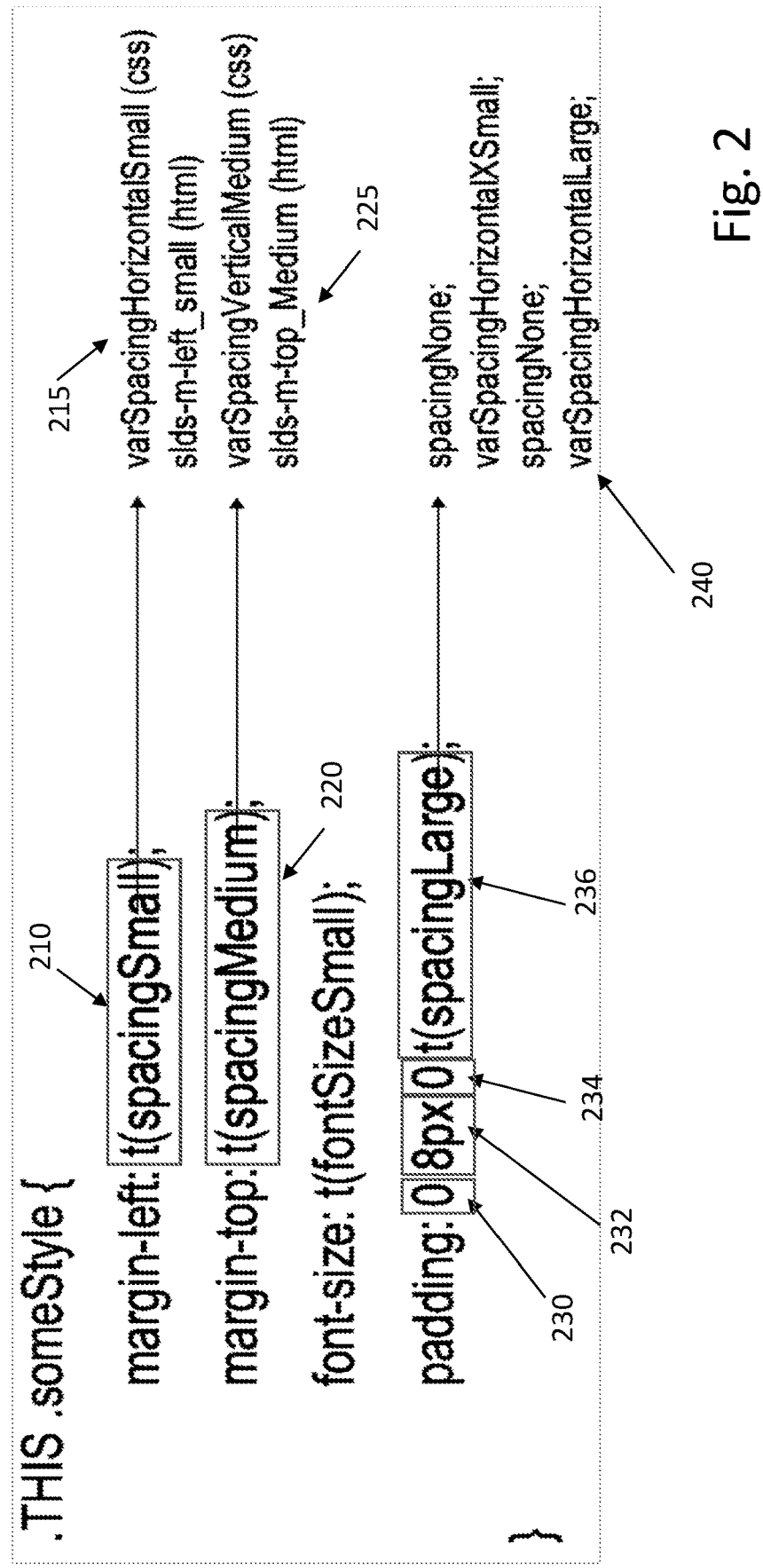
FIG. 2 is an example of a CSS object that can be analyzed and validated as described herein.

FIG. 2 is an example of a CSS object that can be analyzed and validated as described herein. In the example of FIG. 2, recommendations are provided in response to the analysis that can be provided, for example, by validator 115, CSS Validation Utilities 130, JavaScript Validation Utilities 140 and Markup Validation Utilities 150, or any combination thereof.

In the example of FIG. 2, the object includes various tokens (e.g., margin-left: t(spacingSmall) 210, margin-top t(spacingMedium) 220, font-size: t(fontSizeSmall), padding 0 8px 0 t(spacingLarge), 230, 232, 234 and 236). As discussed above, validator 115 and/or other utilities can function to analyze the tokens to determine if they are being used correctly. In one embodiment, the validation process results in various recommendations 220 (e.g., varSpacing-Horizontal (css), slds-m-left_small (html) 215, varSpacingVerticalMedium (css), slds-m-top Medium (html) 225, spacingNone, varSpacingHorizontalXSmall, spacingNone, varSpacingHorizontalLarge) 240).

In some embodiments, recommendations can be provided to a developer via, for example, a popup item in a graphical user interface or a sidebar. Other delivery techniques can also be utilized. In other embodiments, one or more corrections corresponding to recommendations can be made automatically.

The example of FIG. 2 illustrates two examples of cross-referenced tokens. Token 210 (spacingSmall) can represent "varSpacingHorizontalSmall" in the CSS object and can be linked to "slds-m-left_small" in a corresponding HTML object. Similarly, token 220 (spacingMedium) can represent "varSpacingVerticalMedium" in the CSS object and can be linked to "slds-m-top Medium" in a corresponding HTML object. Tokens can also be utilized to represent static values. For example, tokens 230 and 234 ("0") can represent "spacingNone" and token 232 ("8px") can represent "varspacing-HoizontalXSmall".

FIG. 3 is an example of a HyperText/JavaScript object that can be analyzed and validated as described herein. In the example of FIG. 3, recommendations are provided in response to the analysis that can be provided, for example, by validator 115, CSS Validation Utilities 130, JavaScript Validation Utilities 140 and Markup Validation Utilities 150, or any combination thereof.

In the example of FIG. 3, object 300 includes various tokens 310 (e.g., <div class="slds-m-left_small anotherClass slds-m-right_small">, htmlContent: mergedBodySpan, class: 'slds-m-top_small'). As discussed above, validator 115 and/or other utilities can function to analyze the tokens to determine if they are being used correctly. In one embodiment, the validation process results in various recommendations 320 (e.g., slds-m-left_small, slds-m-right_small, slds-m-top_small).

In some embodiments, recommendations 320 can be provided to a developer via, for example, a graphical user interface. Other delivery techniques can also be utilized. In other embodiments, corrections corresponding to recommendations 320 can be made automatically.

Figure 4:
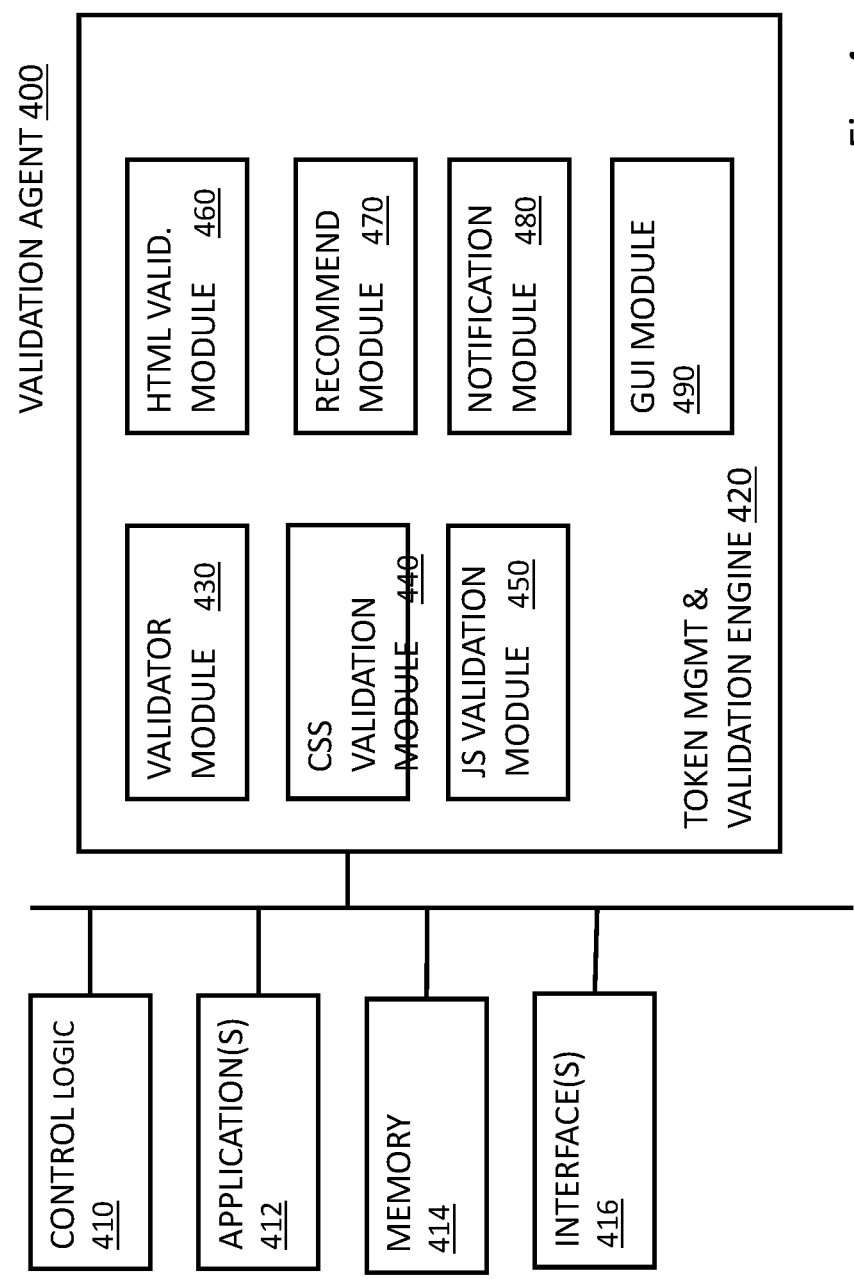
FIG. 4 is a block diagram of one embodiment of a token management and validation agent.

FIG. 4 is a block diagram of one embodiment of a token management and validation agent. In one embodiment, one or more token management and validation agents may exist and/or operate within the host environment. The agent of FIG. 4 may provide functionality as described, for example, with respect to FIGS. 1-3. The agent of FIG. 4 may also provide additional functionality.

In one embodiment, token management and validation agent 400 includes control logic 510, which implements logical functional control to direct operation of token management and validation agent 400, and/or hardware associated with directing operation of token management and validation agent 400. Logic may be hardware logic circuits and/or software routines. In one embodiment, token management and validation agent 400 includes one or more applications 412, which represent a code sequence and/or programs that provide instructions to control logic 410.

Token management and validation agent 400 includes memory 414, which represents a memory device and/or access to a memory resource for storing data and/or instructions. Memory 414 may include memory local to token management and validation agent 400, as well as, or alternatively, including memory of the host system on which token management and validation agent 400 resides. Token management and validation agent 400 also includes one or more interfaces 416, which represent access interfaces to/from (an input/output interface) token management and validation agent 400 with regard to entities (electronic or human) external to token management and validation agent 400.

Token management and validation agent 400 also includes token management and validation engine 420, which represents one or more functions or module that enable token management and validation agent 400 to provide the index backups as described above. The example of FIG. 4 provides several modules that may be included in token management and validation engine 420; however, different and/or additional modules may also be included. Example modules that may be involved in providing the privacy and data governance functionality described herein include, for example, validator module 430, CSS validation module 440, JS validation module 450, HTML validation module 460, recommendation module 470, notification module 480, graphical user interface (GUI) module 490. Each of these modules may further include other sub-modules to provide other functions. As used herein, a module refers to routine, a subsystem, logic circuit, microcode, etc., whether implemented in hardware, software, firmware or some combination thereof.

In various embodiments, validator module 430 operates to perform some or all of the validation functionality described above and/or manage some or all of the validation functionality described above. In some embodiments, validator module 430 communicates through one or more of interfaces 416 to receive one or more objects having one or more tokens as described. In some embodiments, validator module 430 can facilitate the cross-reference of tokens discussed above. In other embodiments, validator module can read data from memory 414 and/or receive data from applications 412.

In various embodiments, CSS validation module 440 functions to analyze one or more tokens corresponding to presentation tokens (e.g., layout, colors, fonts, margins) that can be used in the design and presentation of a graphical interface on a computing device (e.g., computer screen, tablet, wearable device, smartphone). In various embodiments, CSS validation module 440 can improper and/or inconsistent token usage and provide relevant information to, for example, recommendation module 470, notification module 480 and/or GUI module 490. Other configurations can also be supported.

In various embodiments, JS validation module 450 functions to analyze one or more tokens corresponding to scripts that can be used in the design and presentation of a graphical interface on a computing device (e.g., computer screen, tablet, wearable device, smartphone). In various embodiments, JS validation module 450 can improper and/or inconsistent token usage and provide relevant information to, for example, recommendation module 470, notification module 480 and/or GUI module 490. Other configurations can also be supported.

In various embodiments, HTML validation module 460 functions to analyze one or more tokens corresponding to markup language tokens that can be used in the design and presentation of a graphical interface on a computing device (e.g., computer screen, tablet, wearable device, smartphone). In various embodiments, HTML validation module 460 can improper and/or inconsistent token usage and provide relevant information to, for example, recommendation module 470, notification module 480 and/or GUI module 490. Other configurations can also be supported.

Figure 5:
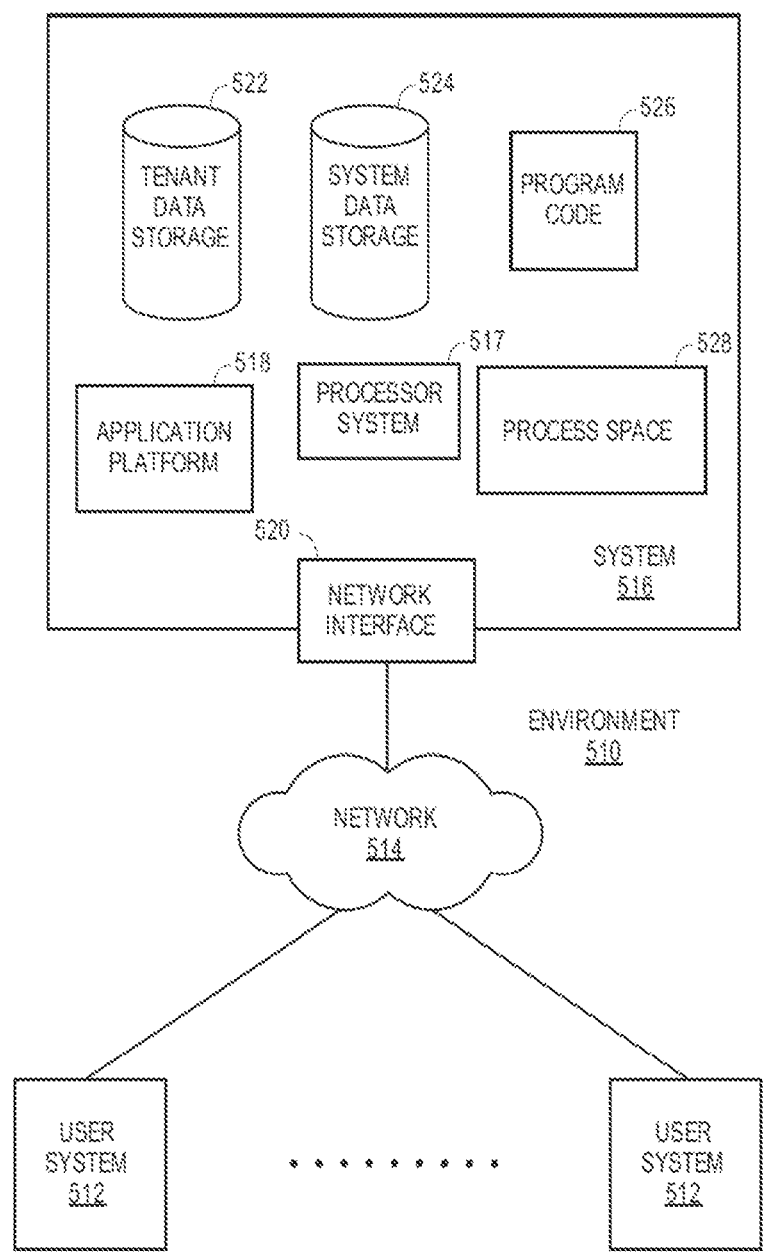
FIG. 5 illustrates a block diagram of an environment where an on-demand database service might be used.

FIG. 5 illustrates a block diagram of an environment 510 wherein an on-demand database service might be used. Environment 510 may include user systems 512, network 514, system 516, processor system 517, application platform 518, network interface 520, tenant data storage 522, system data storage 524, program code 526, and process space 528. In other embodiments, environment 510 may not have all of the components listed and/or may have other elements instead of, or in addition to, those listed above.

Environment 510 is an environment in which an on-demand database service exists. User system 512 may be any machine or system that is used by a user to access a database user system. For example, any of user systems 512 can be a handheld computing device, a mobile phone, a laptop computer, a work station, and/or a network of computing devices. As illustrated in herein FIG. 5 (and in more detail in FIG. 6) user systems 512 might interact via a network 514 with an on-demand database service, which is system 516.

An on-demand database service, such as system 516, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 516" and "system 516" will be used interchangeably herein. A database image may include one or more database objects. A relational database management system (RDMS) or the equivalent may execute storage and retrieval of information against the database object(s). Application platform 518 may be a framework that allows the applications of system 516 to run, such as the hardware and/or software, e.g., the operating system. In an embodiment, on-demand database service 516 may include an application platform 518 that enables creation, managing and executing one or more applications developed by the provider of the on-demand database service, users accessing the on-demand database service via user systems 512, or third party application developers accessing the on-demand database service via user systems 512.

The users of user systems 512 may differ in their respective capacities, and the capacity of a particular user system 512 might be entirely determined by permissions (permission levels) for the current user. For example, where a salesperson is using a particular user system 512 to interact with system 516, that user system has the capacities allotted to that salesperson. However, while an administrator is using that user system to interact with system 516, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 514 is any network or combination of networks of devices that communicate with one another. For example, network 514 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 512 might communicate with system 516 using TCP/IP and, at a higher network level, use other common Internet protocols to communicate, such as HTTP, FTP, AFS, WAP, etc. In an example where HTTP is used, user system 512 might include an HTTP client commonly referred to as a "browser" for sending and receiving HTTP messages to and from an HTTP server at system 516. Such an HTTP server might be implemented as the sole network interface between system 516 and network 514, but other techniques might be used as well or instead. In some implementations, the interface between system 516 and network 514 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 516, shown in FIG. 5, implements a web-based customer relationship management (CRM) system. For example, in one embodiment, system 516 includes application servers configured to implement and execute CRM software applications as well as provide related data, code, forms, webpages and other information to and from user systems 512 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 516 implements applications other than, or in addition to, a CRM application. For example, system 516 may provide tenant access to multiple hosted (standard and custom) applications, including a CRM application. User (or third party developer) applications, which may or may not include CRM, may be supported by the application platform 518, which manages creation, storage of the applications into one or more database objects and executing of the applications in a virtual machine in the process space of the system 516.

One arrangement for elements of system 516 is shown in FIG. 5, including a network interface 520, application platform 518, tenant data storage 522 for tenant data 523, system data storage 524 for system data 525 accessible to system 516 and possibly multiple tenants, program code 526 for implementing various functions of system 516, and a process space 528 for executing MTS system processes and tenant-specific processes, such as running applications as part of an application hosting service. Additional processes that may execute on system 516 include database indexing processes.

Several elements in the system shown in FIG. 5 include conventional, well-known elements that are explained only briefly here. For example, each user system 512 could include a desktop personal computer, workstation, laptop, PDA, cell phone, or any wireless access protocol (WAP) enabled device or any other computing device capable of interfacing directly or indirectly to the Internet or other network connection. User system 512 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 512 to access, process and view information, pages and applications available to it from system 516 over network 514. Each user system 512 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 516 or other systems or servers. For example, the user interface device can be used to access data and applications hosted by system 516, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 512 and all of its components are operator configurable using applications, such as a browser, including computer code run using a central processing unit such as an Intel Core series processor or the like. Similarly, system 516 (and additional instances of an MTS, where more than one is present) and all of their components might be operator configurable using application(s) including computer code to run using a central processing unit such as processor system 517, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 516 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 516 is configured to provide webpages, forms, applications, data and media content to user (client) systems 512 to support the access by user systems 512 as tenants of system 516. As such, system 516 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 6:
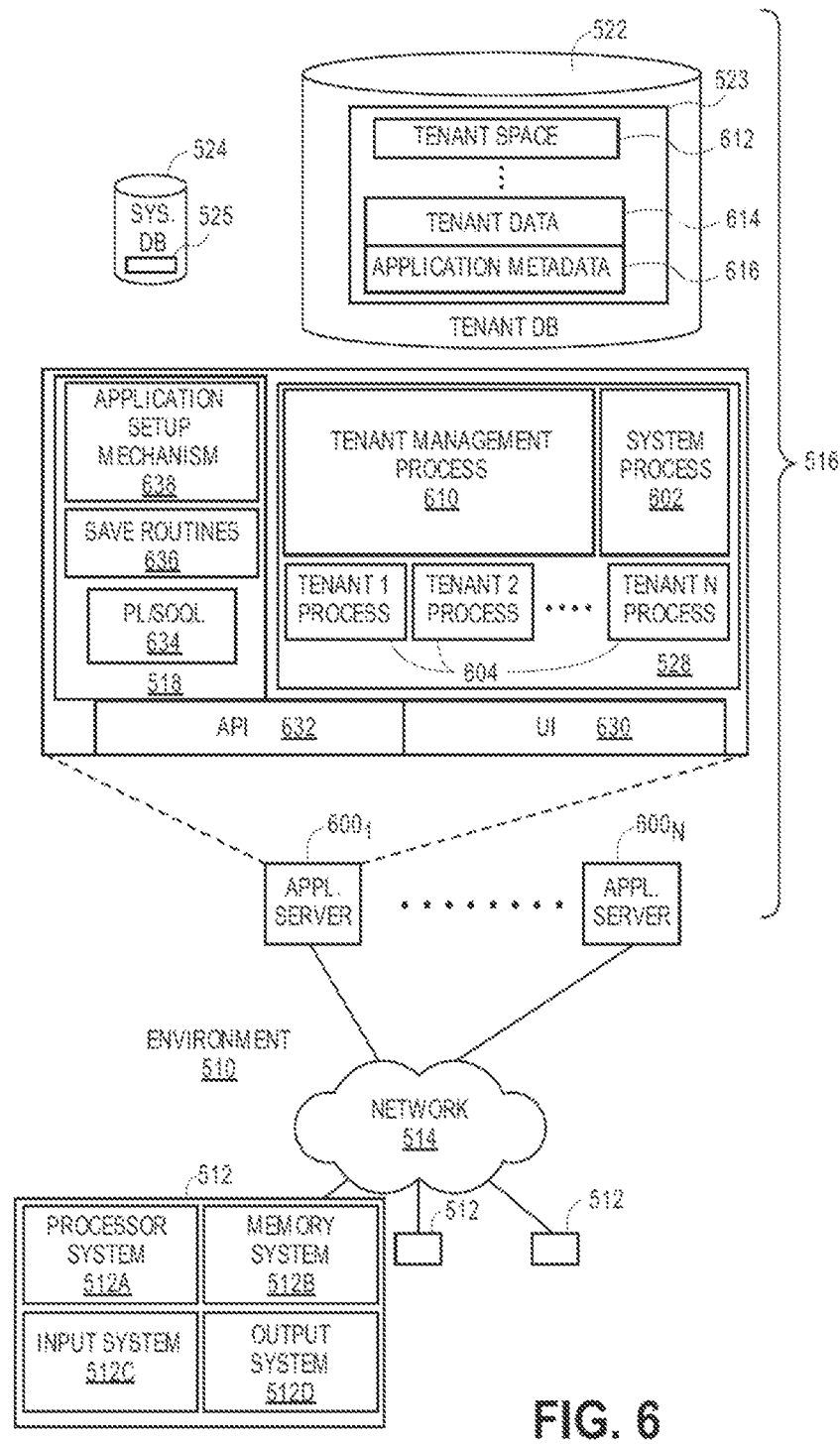
FIG. 6 illustrates another block diagram of an environment where an on-demand database service might be used.

FIG. 6 also illustrates environment 510. However, in FIG. 6 elements of system 516 and various interconnections in an embodiment are further illustrated. FIG. 6 shows that user system 512 may include processor system 512A, memory system 512B, input system 512C, and output system 512D. FIG. 6 shows network 514 and system 516. FIG. 6 also shows that system 516 may include tenant data storage 522, tenant data 523, system data storage 524, system data 525, User Interface (UI) 630, Application Program Interface (API) 632, PL/SOQL 634, save routines 636, application setup mechanism 638, applications servers $600_1$-$600_N$, system process space 602, tenant process spaces 604, tenant management process space 610, tenant storage area 612, user storage 614, and application metadata 616. In other embodiments, environment 510 may not have the same elements as those listed above and/or may have other elements instead of, or in addition to, those listed above.

User system 512, network 514, system 516, tenant data storage 522, and system data storage 524 were discussed above in FIG. 5. Regarding user system 512, processor system 512A may be any combination of one or more processors. Memory system 512B may be any combination of one or more memory devices, short term, and/or long term memory. Input system 512C may be any combination of input devices, such as one or more keyboards, mice, trackballs, scanners, cameras, and/or interfaces to networks. Output system 512D may be any combination of output devices, such as one or more monitors, printers, and/or interfaces to networks. As shown by FIG. 6, system 516 may include a network interface 520 (of FIG. 5) implemented as a set of HTTP application servers 600, an application platform 518, tenant data storage 522, and system data storage 524. Also shown is system process space 602, including individual tenant process spaces 604 and a tenant management process space 610. Each application server 600 may be configured to tenant data storage 522 and the tenant data 523 therein, and system data storage 524 and the system data 525 therein to serve requests of user systems 512. The tenant data 523 might be divided into individual tenant storage areas 612, which can be either a physical arrangement and/or a logical arrangement of data. Within each tenant storage area 612, user storage 614 and application metadata 616 might be similarly allocated for each user. For example, a copy of a user's most recently used (MRU) items might be stored to user storage 614. Similarly, a copy of MRU items for an entire organization that is a tenant might be stored to tenant storage area 612. A UI 630 provides a user interface and an API 632 provides an application programmer interface to system 516 resident processes to users and/or developers at user systems 512. The tenant data and the system data may be stored in various databases, such as one or more Oracle™ databases.

Application platform 518 includes an application setup mechanism 638 that supports application developers' creation and management of applications, which may be saved as metadata into tenant data storage 522 by save routines 636 for execution by subscribers as one or more tenant process spaces 604 managed by tenant management process 610 for example. Invocations to such applications may be coded using PL/SOQL 634 that provides a programming language style interface extension to API 632. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 616 for the subscriber making the invocation and executing the metadata as an application in a virtual machine.

Each application server 600 may be communicably coupled to database systems, e.g., having access to system data 525 and tenant data 523, via a different network connection. For example, one application server $600_1$ might be coupled via the network 514 (e.g., the Internet), another application server $600_{N-1}$ might be coupled via a direct network link, and another application server $600_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 BIG-IP load balancer) is communicably coupled between the application servers 600 and the user systems 512 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user could hit three different application servers 600, and three requests from different users could hit the same application server 600. In this manner, system 516 is multi-tenant, wherein system 516 handles storage of, and access to, different objects, data and applications across disparate users and organizations.

As an example of storage, one tenant might be a company that employs a sales force where each salesperson uses system 516 to manage their sales process. Thus, a user might maintain contact data, leads data, customer follow-up data, performance data, goals and progress data, etc., all applicable to that user's personal sales process (e.g., in tenant data storage 522). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 516 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 516 might also maintain system level data usable by multiple tenants or other data. Such system level data might include industry reports, news, postings, and the like that are sharable among tenants.

In certain embodiments, user systems 512 (which may be client systems) communicate with application servers 600 to request and update system-level and tenant-level data from system 516 that may require sending one or more queries to tenant data storage 522 and/or system data storage 524. System 516 (e.g., an application server 600 in system 516) automatically generates one or more SQL statements (e.g., one or more SQL queries) that are designed to access the desired information. System data storage 524 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Various embodiments of the techniques herein can be provided within an on-demand services environment. The on-demand services environment can include a multitenant database environment to support multiple clients while maintaining privacy and data protection between clients. Various embodiments are described in greater detail below.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A non-transitory computer-readable medium having stored thereon instructions that, when executed by one or more processors, are configurable to cause the one or more processors to:

provide, with one or more hardware processors, one or more tokens to represent at least one style characteristic for an updated version of a graphical user interface (GUI), comprising at least a script component and a layout element utilizing the one or more tokens;

provide, with the one or more hardware processors, an update bundle corresponding to the updated version of the GUI having two or more tokens representing changes from at least one previous version of corresponding tokens in previous versions of the GUI, the update bundle to specify current versions of the tokens;

analyze, with a validation agent, at least the updated version of code for the GUI and the at least one previous version of the GUI to determine if the updated version of the code utilizes the two or more tokens in a manner consistent with the current versions of the tokens;

generate, with the one or more hardware processors, an activity list for tokens not being used in the manner consistent with the current versions of the tokens.

2. The non-transitory computer-readable medium of claim 1 wherein the layout component comprises a markup language element.

3. The non-transitory computer-readable medium of claim 1 wherein tokens of different types can be cross-referenced within a single bundle.

4. The non-transitory computer-readable medium of claim 1 wherein the activity list causes, automatically and without user interaction, one or more modifications to the UI code to correct code not being used in the manner consistent with the current versions of the tokens.

5. The non-transitory computer-readable medium of claim 1 wherein the activity list causes, automatically and without user interaction, one or more messages to be sent indicating the UI code not being used in the manner consistent with the current versions of the tokens.

6. The non-transitory computer-readable medium of claim 1 further comprising instructions that, when executed by the one or more processors, are configurable to cause the bundle can be translated into an abstract syntax tree (AST).

7. A method comprising:

providing, with one or more hardware processors, one or more tokens to represent at least one style characteristic for an updated version of a graphical user interface (GUI), comprising at least a script component and a layout element utilizing the one or more tokens;

providing, with the one or more hardware processors, an update bundle corresponding to the updated version of the GUI having two or more tokens representing changes from at least one previous version of corresponding tokens in previous versions of the GUI, the update bundle to specify current versions of the tokens;

analyzing, with a validation agent, at least the updated version of code for the GUI and the at least one previous version of the GUI to determine if the updated version of the code utilizes the two or more tokens in a manner consistent with the current versions of the tokens;

generating, with the one or more hardware processors, an activity list for tokens not being used in the manner consistent with the current versions of the tokens.

8. The method of claim 7 wherein the layout component comprises a markup language element.

9. The method of claim 7 wherein tokens of different types can be cross-referenced within a single bundle.

10. The method of claim 7 wherein the activity list causes, automatically and without user interaction, one or more modifications to the UI code to correct code not being used in the manner consistent with the current versions of the tokens.

11. The method of claim 7 wherein the activity list causes, automatically and without user interaction, one or more messages to be sent indicating the UI code not being used in the manner consistent with the current versions of the tokens.

12. The method of claim 7 further comprising instructions that, when executed by the one or more processors, are configurable to cause the bundle can be translated into an abstract syntax tree (AST).

13. A system comprising:
a memory system;
one or more hardware processors coupled with the memory system, the one or more hardware processors configurable to provide one or more tokens to represent at least one of a style characteristic, a script component and a layout element, to provide one or more tokens to represent at least one style characteristic for an updated version of a graphical user interface (GUI), comprising at least a script component and a layout element utilizing the one or more tokens, to provide an update bundle corresponding to the updated version of the GUI having two or more tokens representing changes from at least one previous version of corresponding tokens in previous versions of the GUI, the update bundle to specify current versions of the tokens, to analyze at least the updated version of code for the GUI and the at least one previous version of the GUI to determine if the updated version of the code utilizes the two or more tokens in a manner consistent with the current versions of the tokens, to generate an activity list for tokens not being used in the manner consistent with the current versions of the tokens.

14. The system of claim 13 wherein the layout component comprises a markup language element.

15. The system of claim 13 wherein tokens of different types can be cross-referenced within a single bundle.

16. The system of claim 13 wherein the activity list causes, automatically and without user interaction, one or more modifications to the UI code to correct code not being used in the manner consistent with the current versions of the tokens.

17. The system of claim 13 wherein the activity list causes, automatically and without user interaction, one or more messages to be sent indicating the UI code not being used in the manner consistent with the current versions of the tokens.

18. The system of claim 13 further comprising instructions that, when executed by the one or more processors, are configurable to cause the bundle can be translated into an abstract syntax tree (AST).

* * * * *